(12) United States Patent
Parraga

(10) Patent No.: US 7,660,680 B1
(45) Date of Patent: Feb. 9, 2010

(54) SYSTEMS AND METHODS FOR TOTALIZING PARALLEL FEEDS

(75) Inventor: John R. Parraga, Anthem, AZ (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 593 days.

(21) Appl. No.: 11/426,441

(22) Filed: Jun. 26, 2006

(51) Int. Cl.
*G01F 1/00* (2006.01)

(52) U.S. Cl. .......... 702/45; 700/106; 700/108; 700/121; 264/40.1; 264/40.7; 264/40.3; 264/211

(58) Field of Classification Search .......... 702/45; 700/103, 108, 106, 121; 264/40.1, 40.7, 264/40.3, 211
See application file for complete search history.

(56) References Cited

U.S. PATENT DOCUMENTS

| | | | |
|---|---|---|---|
| 4,089,509 A | 5/1978 | Morton et al. | |
| 4,448,736 A * | 5/1984 | Emery et al. | 264/40.1 |
| 4,502,318 A | 3/1985 | Converse, III et al. | |
| 4,758,118 A | 7/1988 | Rachner et al. | |
| 4,802,981 A | 2/1989 | Kenny et al. | |
| 5,452,954 A | 9/1995 | Handke et al. | |
| 5,522,459 A * | 6/1996 | Padgett et al. | 166/285 |
| 5,784,974 A * | 7/1998 | Krauss | 110/186 |
| 5,831,151 A * | 11/1998 | Ondrus et al. | 73/61.41 |
| 6,352,360 B1 | 3/2002 | Yamada | |
| 6,560,544 B1 * | 5/2003 | Ondrus | 702/23 |
| 6,630,028 B2 * | 10/2003 | Briese et al. | 118/683 |
| 7,379,782 B1 * | 5/2008 | Cocco | 700/103 |
| 2007/0062422 A1 * | 3/2007 | Wotring | 110/165 R |
| 2007/0169837 A1 * | 7/2007 | Cohen et al. | 141/102 |
| 2008/0111540 A1 * | 5/2008 | Targosz | 324/204 |

* cited by examiner

*Primary Examiner*—Carol S Tsai
(74) *Attorney, Agent, or Firm*—Turocy & Watson LLP; William R. Walburn

(57) ABSTRACT

Systems and methods are provided for automatically totalizing materials from multiple feed locations in parallel while mitigating device requirements to monitor such locations. In one aspect, an industrial automation system to process materials is provided. The system includes a totalizer component to determine an aggregated amount of materials supplied from at least two feed locations. A logic component periodically monitors at least one of the feed locations to determine the amount of each material.

23 Claims, 12 Drawing Sheets

SYSTEMS AND METHODS FOR TOTALIZING PARALLEL FEEDS

TECHNICAL FIELD

The subject invention relates generally to industrial control systems, and more particularly to systems and methods that distribute feed materials in a parallel process while employing a reduced number of totalizing devices to measure such materials.

BACKGROUND

A Programmable Logic Controller (PLC) is an industrial computer control system that continuously monitors the state of input devices and performs automated decisions based upon a user-designed program to control the state of output devices. Almost any production line, machine function, or process can be greatly enhanced using this type of control system. However, one main benefit in using a PLC is the ability to change and replicate the operation or process while collecting and communicating vital information. Another advantage of a PLC system is that it is modular. That is, users can mix and match the types of Input and Output devices to best suit a given application.

Programmable Logic Controllers are programmed by systems designers to operate manufacturing processes via user-designed logic programs or user programs. The user programs are stored in memory and generally executed by the PLC in a sequential manner although instruction jumping, looping and interrupt routines, for example, are also common. Associated with the user program are a plurality of memory elements or variables that provide dynamics to PLC operations and programs. Differences in PLCs are typically dependent on the number of Input/Output (I/O) they can process, amount of memory, number and type of instructions, and speed of the PLC central processing unit (CPU).

One application that PLCs are particularly well-suited is for controlling the amounts of materials solids, gases or liquids that are employed in manufacture of a given process. In a many industries, materials such as various types of grain are employed to produce the final products. In other applications, various liquids are added and mixed to produce the desired product at hand. In order to successfully manufacture such products in highly automated manner, various measuring techniques are required to determine the amounts of materials that have been added to or mixed with a given process or recipe. In general, measuring devices such as load cells, flow meters, or other devices are employed to automatically measure the amount of product added to a container for example, where instructions within the PLC are utilized to determine the precise amount that has in fact been added to the batch, recipe, or process. Such applications for determining these amounts are referred to as totalizer applications or totalizing applications.

As can be appreciated, integrated manufacturing operations involve high-complexity manufacturing processes. Such processes are involved in many areas of modern production. Often, complex factory equipment arrangements and programming are required to provide the functionality necessary to measure the required amount of materials. This can include significant expense to install and maintain equipment such as load cells and flow meters to measure such materials. In view of such expense, a single means of measuring material amounts required for a given process is often utilized. Single measuring points forces manufacturing processes to perform material additions to the process—one at a time, in order to measure accurately differing materials and material amounts. By causing materials to be added sequentially, process costs are increased due to the increased time to manufacture. Thus, the reduction in overall time to perform these additions is often limited to minimizing the dead-time between sequential material additions.

SUMMARY

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

Systems and methods are provided that enable parallel feeds or supplies of material into a process while mitigating the requirements for multiple measuring devices to account for such material. One aspect is to establish a relationship of each material addition to an overall flow rate, and using this relationship to determine what portion of the overall combined flow is attributable to each material. In one aspect, at least one totalizer is employed that can measure materials from multiple feed locations. Mathematical Integration and derivative processes are applied to measurement device feedback that enables determination of totalized material amounts from the parallel feeds that have been added to a given process. In this manner, automated processes can be expedited since materials can be added in parallel yet controlled since accurate determinations of totalized amounts can be determined even though a reduced amount of measuring devices are employed. By limiting the number of devices, process costs and maintenance can be mitigated.

In order to control substantially precise amounts of materials added to a process, switching and logic components are provided that monitor the desired feed amounts being supplied. For instance in a two material process where materials M1 and M2 are added, M1 and M2 can be periodically switched into and out of a process as an automated check to facilitate that the desired amounts are indeed added to the totalized amount. As can be appreciated, a plurality of such materials can be supplied to the process in parallel. For example, in one case, M1 and M2 may be assumed to be added in desired proportions. However, if one material were actually below the desired amount by a given percentage, and the other material were above by a similar percentage, the final totalized amount may be in error if a constant rate of feed were assumed. Thus, periodically, during the process, material feeds can be switched on and off for a short period, where steady states of feed are automatically determined. Processes can then be automatically checked to facilitate that the desired amount is within control limits or a predetermined range established for such process. User interfaces can be provided to allow users to tune a particular system for desired periods of monitoring in view of feed material characteristics and measurement dynamics.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent

DETAILED DESCRIPTION

Systems and methods are provided for automatically totalizing materials from multiple feed locations in parallel while mitigating device requirements to monitor such locations. In one aspect, an industrial automation system to process materials is provided. The system includes a totalizer component to determine an aggregated amount of materials supplied from at least two feed locations. A logic component periodically monitors at least one of the feed locations to determine whether an amount of materials supplied are within a predetermined or desired range. User interfaces can be provided to adjust thresholds for such ranges and to change logic functions such as how often to monitor a given process in order to facilitate a desired amount of process consistency or accuracy.

It is noted that as used in this application, terms such as "component," "totalizer," "integrator," "interface," and the like are intended to refer to a computer-related entity, either hardware, a combination of hardware and software, software, or software in execution as applied to an automation system for industrial control. For example, a component may be, but is not limited to being, a process running on a processor, a processor, an object, an executable, a thread of execution, a program and a computer. By way of illustration, both an application running on a server and the server can be components. One or more components may reside within a process and/or thread of execution and a component may be localized on one computer and/or distributed between two or more computers, industrial controllers, and/or modules communicating therewith.

Figure 1:
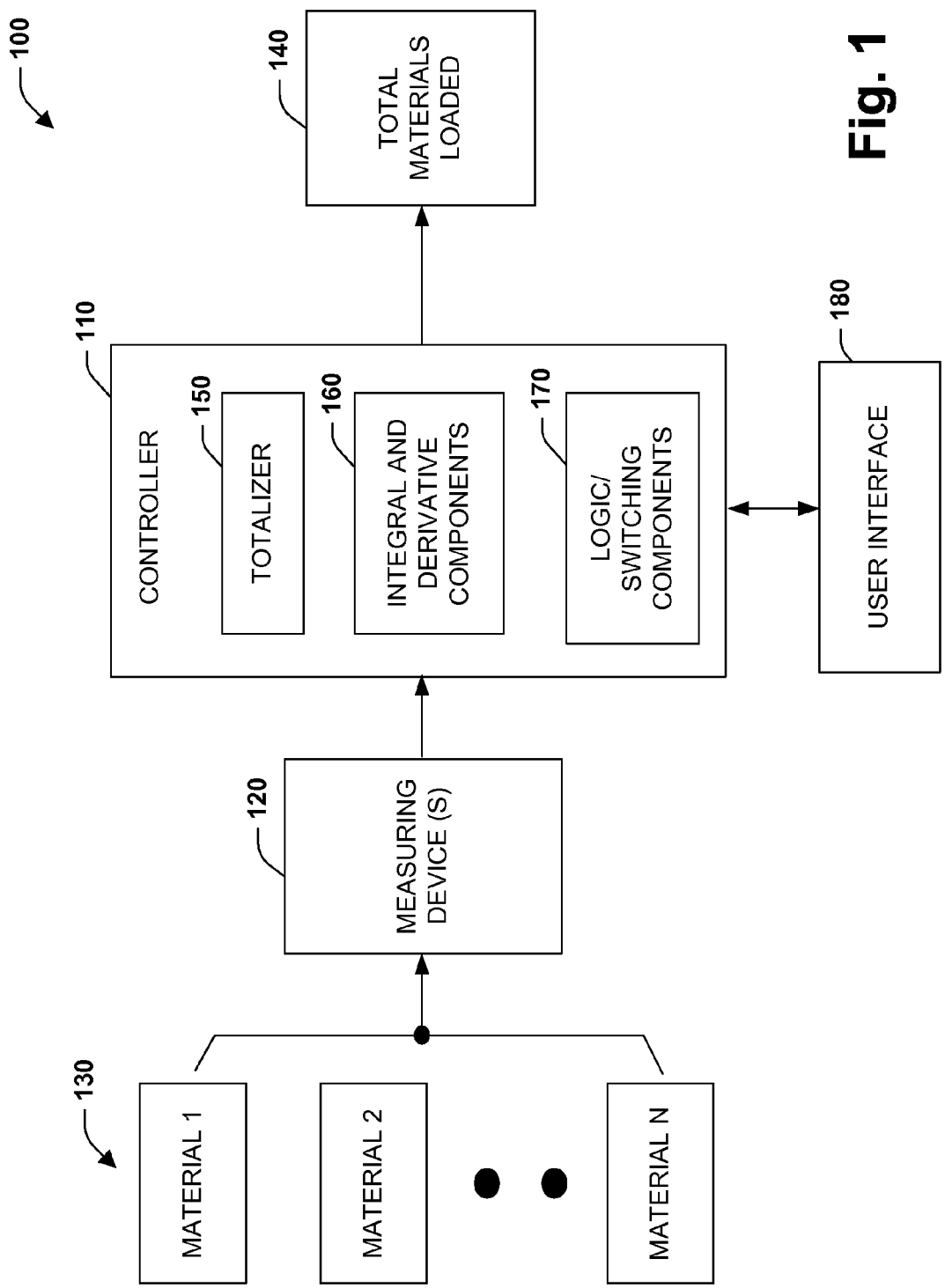
FIG. 1 is a schematic block diagram illustrating industrial control system for processing parallel material feeds.

Referring initially to FIG. 1, a system 100 illustrates industrial control components for processing parallel material feeds. The system 100 includes at least one controller 110 that receives input from at least one measuring device 120. Such devices 120 can include flow meters, counters, digital or analog components, flow meters, load cells and so forth. The measuring device 120 measures or monitors materials 130 from multiple feed locations. In general, two or more materials 130 are monitored via a single device 120. It is to be appreciated however that other arrangements are possible. For example, in general, the components described herein can be applied to substantially any system where there are fewer measuring devices that feed locations supplying the materials 130 (e.g., 5 feed locations and three measuring devices).

The controller 110 employs several components to determine a total or aggregated amount of materials at 140 via the measuring device 120. In order to measure multiple materials 130 from the measuring device 120, a totalizer component 150 is provided that employs integral and derivative components 160 to determine the total material loaded at 140. For example, an integral of a flow rate provides the total weight that has accumulated. A derivative of the weight accumulated can provide the flow rate for a given feed. Taking the derivative of the flow rate can be employed to determine when a steady state feed has occurred (e.g., when the derivative approaches zero (or predetermined threshold) on a rate measurement, steady state has been achieved). A logic (or switching components) component 170 are supplied to switch on and off feed locations supplying the materials 130. In this manner, control processes can be checked to determine that the total materials loaded at 140 are within a desired range and/or tolerance as will be described in more detail below.

As can be appreciated, the totalizer 150, integral and derivative components 160, and/or logic components 170 can be supplied via software or hardware components within the controller 170. As illustrated, a user interface 180 can be provided to enable adjustment of parameters that control the components 150, 160, and/or 170. For example, a process variable can be provided for adjusting how often material switching/monitoring is provided via the logic component 170. Other adjustments can include settings of thresholds, ranges, and the like for a given process.

In general, the system 100 allows parallel feeds or supplies of material 130 into a process while mitigating the requirements for multiple measuring devices 120 to account or measure such material. In one example, at least one totalizer 150 is employed that can measure materials from multiple feed locations 130. Integration and derivative components 160 monitor measuring device 120 outputs that enable determination of totalized material amounts 140 from the parallel feeds 130 that have been supplied to a given process. In this manner, automated processes can be expedited since materials 130 can be added in parallel yet controlled since accurate determinations of totalized amounts can be determined even though a reduced amount of measuring devices 120 are employed. By limiting the number of measuring devices 120, process costs and maintenance can be mitigated in the system 100.

In order to control substantially precise amounts of materials added to a process, the switching and logic components 170 are provided that monitor the desired feed amounts being supplied. For instance in a multiple material process where example materials M1, M2, and M3 are added, M1, M2, and/or M3 can be periodically switched (or pulsed) into and out of a process via the logic component 170 as an automated check to facilitate that the desired amounts are indeed added to the totalized amount 140. As can be appreciated, a plurality of such materials 130 can be supplied to the process in parallel. For example, M1, M2, M3 or other materials 130 may be assumed to be added in desired proportions. However, if one material were actually below the desired amount by a given percentage, and the other material were above by a similar percentage, the final totalized amount may be in error if a constant rate of feed were assumed. Thus, periodically, during the process, material feeds can be switched on and off via the logic component 170 for predetermined and/or adjustable periods, where steady states of feed are automatically determined. Processes can then be automatically checked to facilitate that the desired amount for a selected material 130 is within control limits or a predetermined range established for such process. User interfaces 180 can be provided to allow users to tune a particular system for desired periods of monitoring in view of feed material characteristics and measurement dynamics.

Before proceeding, it is noted that the system 100 can include various computer or network components such as servers, clients, communications modules, mobile computers, wireless components, Application Oriented Infrastructure (AON) type devices, application and integration servers, message brokers, and so forth which are capable of interacting across a network with one or more controllers 110. Similarly, the term PLC as used herein can include functionality that can be shared across multiple components, systems, and/or networks. For example, one or more PLCs can communicate and cooperate with various network devices across the network. This can include substantially any type of control, communications module, computer, I/O device, Human Machine Interface (HMI)) that communicate via the network which includes control, automation, and/or public networks.

The PLC can also communicate to and control various other devices such as Input/Output modules including Analog, Digital, Programmed/Intelligent I/O modules, other programmable controllers, communications modules, and the like. Associated networks can include public networks such as the Internet, Intranets, and automation networks such as Control and Information Protocol (CIP) networks including DeviceNet and ControlNet. Other networks include Ethernet, DH/DH+, Remote I/O, Fieldbus, MODBUS, Profibus, Web Services, wireless networks, serial protocols, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

It is further noted that one or more graphical user interfaces can be provided for the user interface 180. It is further noted that the respective interfaces can be provided in various other different settings and context. As an example, the interfaces discussed herein can be associated with a desktop development tool, mail application, calendar application, and/or web browser although other type applications can be utilized. These interfaces can be associated with a Graphical User Interface (GUI), wherein the GUI provides a display having one or more display objects (not shown) including such aspects as configurable icons, buttons, sliders, input boxes, selection options, menus, tabs and so forth having multiple configurable dimensions, shapes, colors, text, data and sounds to facilitate operations with the applications and/or models. In addition, the GUI can also include a plurality of other inputs or controls for adjusting and configuring one or more aspects. This can include receiving user commands from a mouse, keyboard, speech input, web site, remote web service, and/or other device such as a camera or video input to affect or modify operations of the GUI.

Figure 2:
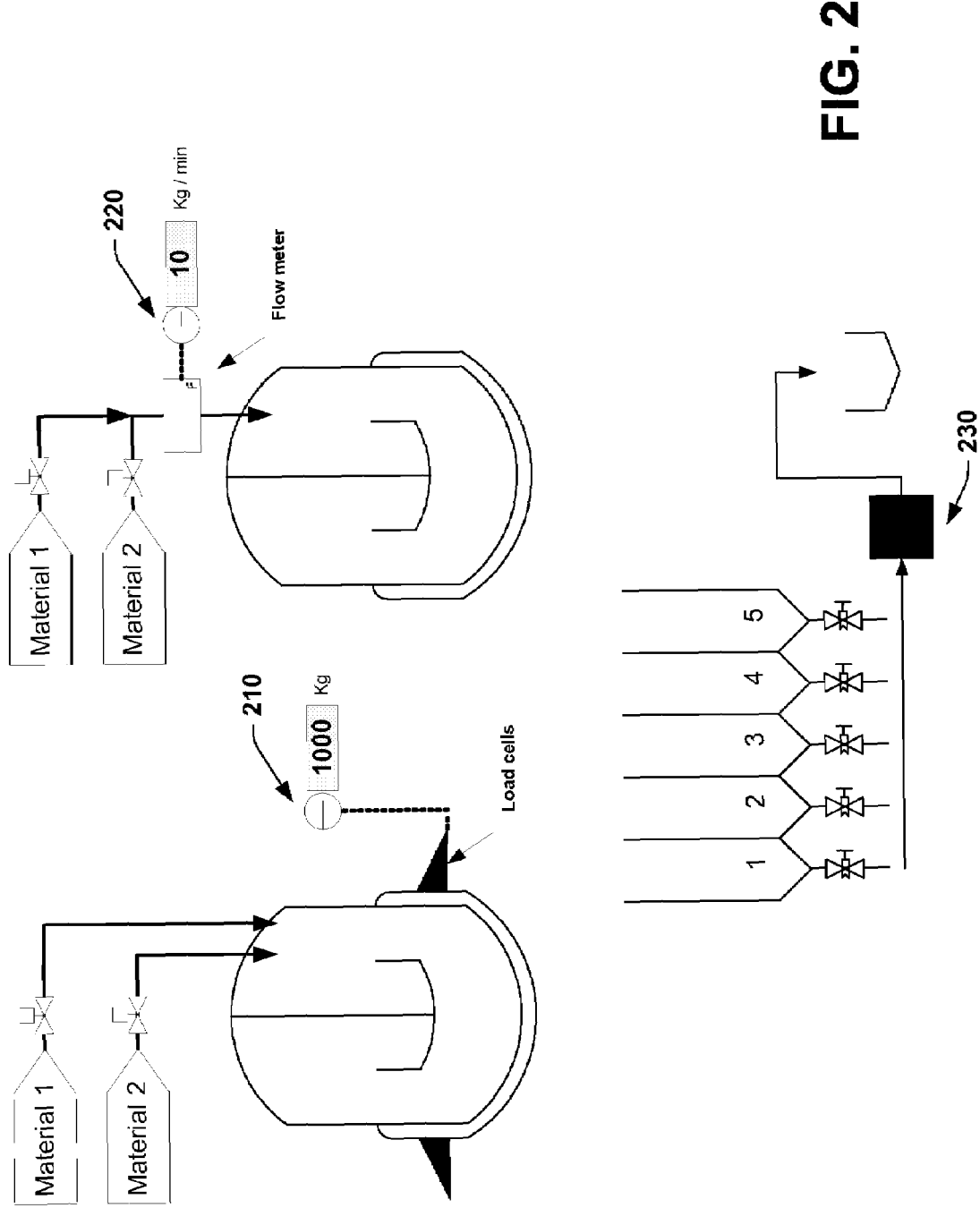
FIG. 2 is a diagram illustrating example feed systems and measuring devices.

Referring now to FIG. 2, example feed systems and measuring devices are illustrated. Before proceeding, it is noted that many of the following examples show dual feed systems with a single measuring device. As previously noted above, a plurality of feeds can be provided including employment of more than one measuring device. Generally, more parallel feeds are provided than measuring devices. In one example, a tank is mounted on Load cells at 210, where materials M1 and M2 are added in parallel. Load cells provide a weight readout that is used to totalize the material added. In another example, two materials are added through a single flow meter at 220 where an in line flow meter is used to determine the rate of material added and hence the total amount. At 230, a system employing five feeds is measured via a single flow meter or load cell although other types of measuring devices may be employed.

Figure 3:
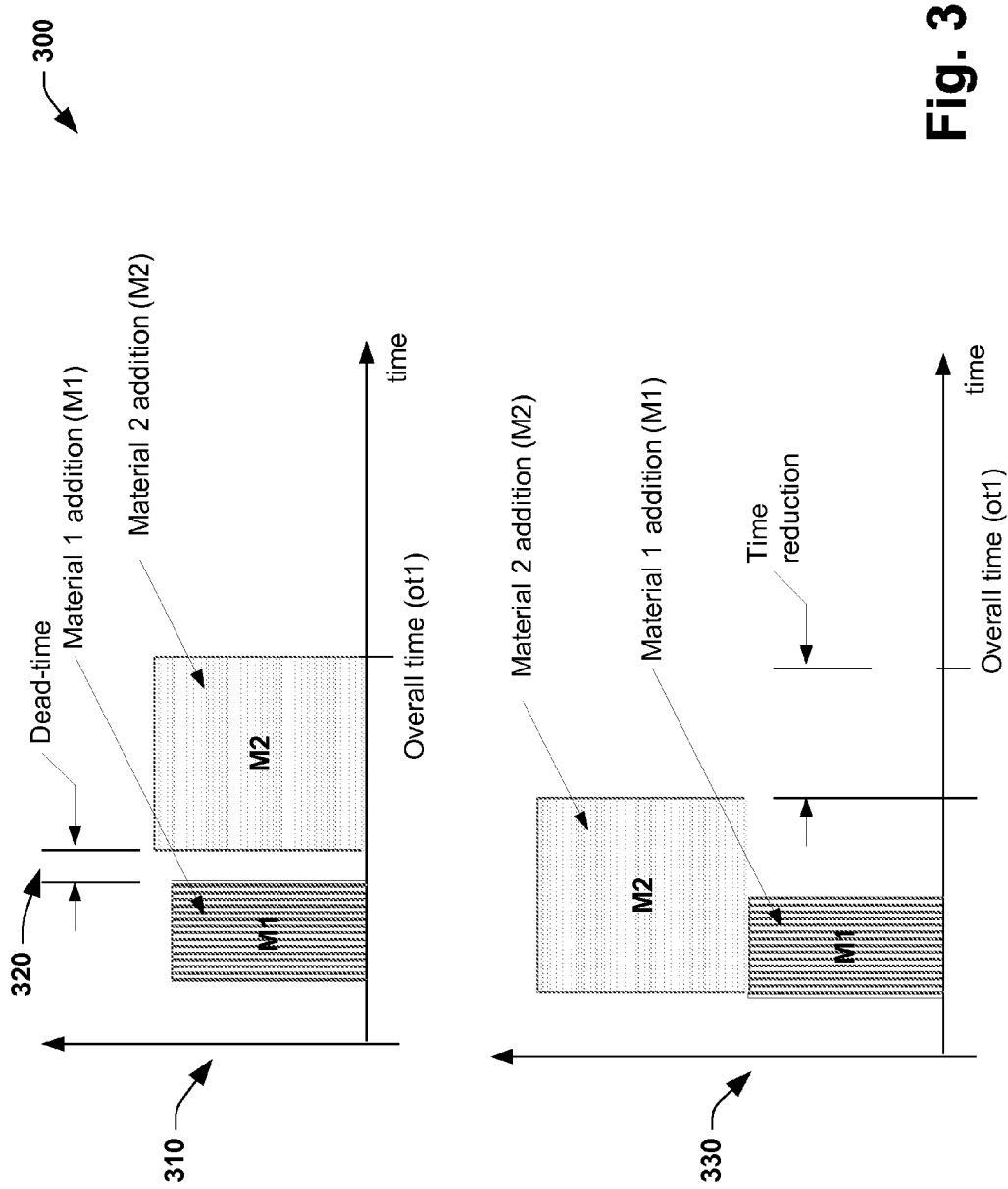
FIG. 3 is a diagram illustrating sequential and parallel feed additions.

Turning to FIG. 3, a diagram 300 illustrates sequential and parallel feed additions. In many applications, a single means of measuring the amount of material required is utilized to reduce overall manufacturing costs, thus forcing the manufacturing process to perform material additions one at a time as illustrated at 310. The reduction in overall time to perform these additions is often limited to minimizing dead-time as shown at 320. It is desirable to perform and measure the addition of substantially all material feeds at concurrent times as illustrated at 330 yet mitigate the number of measuring devices employed, where this often is perceived as a limitation of the measuring equipment hardware. Systems and/or methods are thus provided that enable the addition of multiple materials in parallel in an industrial system. This includes establishing a relationship of each material addition to an overall flow rate, and using this relationship to determine what portion of the overall combined flow belongs to each material as will be described in more detail below.

Figure 4:
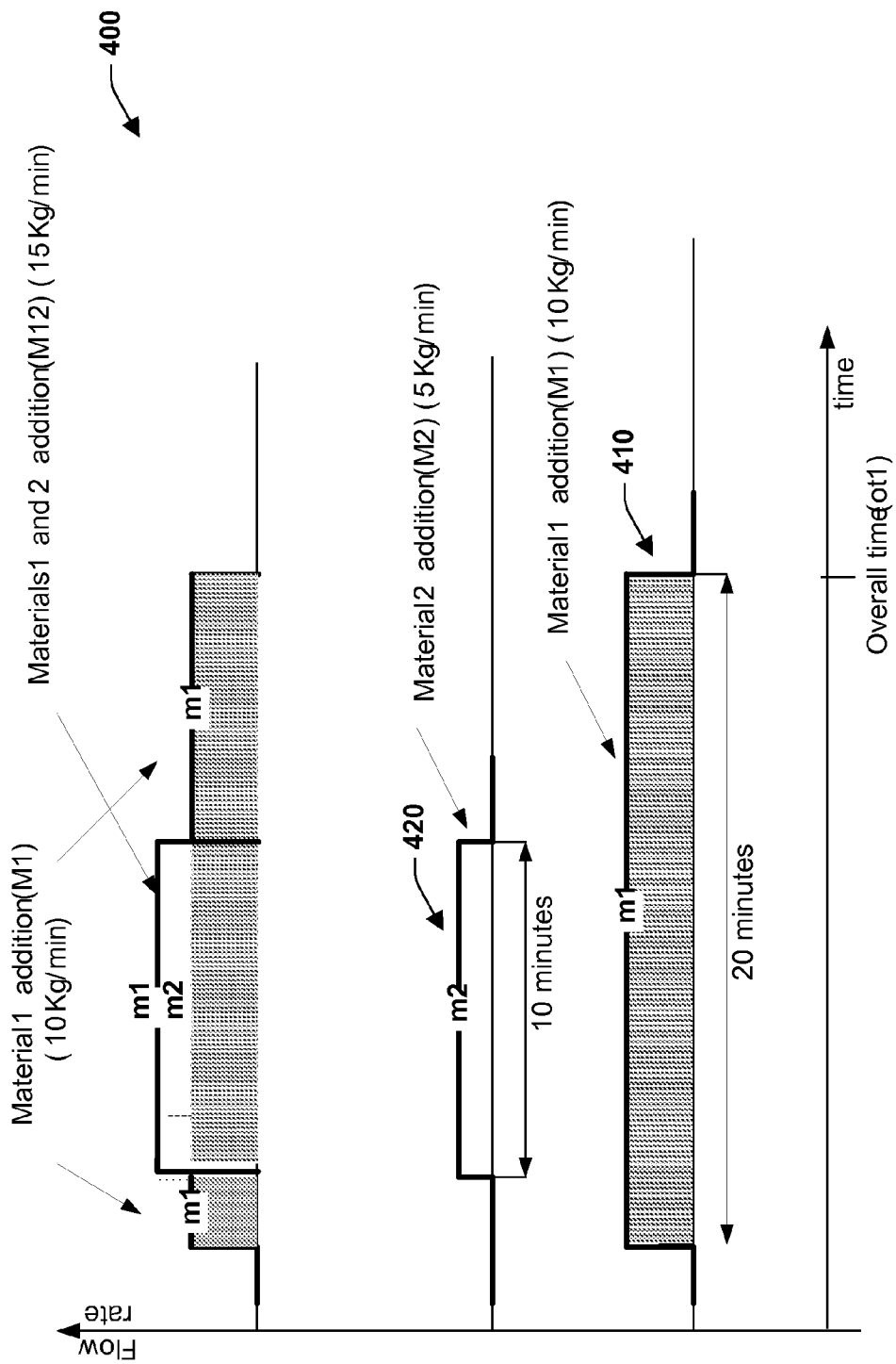
FIG. 4 is a diagram that highlights an idealized process for parallel feed additions.

FIG. 4 illustrates a diagram 400 that highlights an idealized process for parallel feed additions. In this example, if Material 1 (M1) at 410 flows at 10 Kg/min and the combined overall flow rate of M1 and M2 is 15 Kg/min then the flow rate of material 2 (M2) should be of 5 Kg/min. From the diagram 400, it can be determined that the Total amount of material 1 added is TM1=(M1 Flow rate)(M1 duration)=(10 kg/min)(20 min)=200 kg. Now the amount of material 2 (TM2) at 420 can be calculated such as for example:

1) The difference between the total amount added (If overall is totalized) and the amount of TM1, thus TM2=250 Kg−200 Kg=50 kg.

2) The difference in flow rate times the duration of M2 feed.

$$TM2 = (\text{overall flow rate} - M1 \text{ Flow rate})(M2 \text{ duration})$$

$$TM2 = (15 \text{kg/min} - 10 \text{ kg/min})(10 \text{ minutes}) = 50 \text{ kg}.$$

In idealized situation without noise or dynamic process conditions, as in the diagram 400, the flow rates remain constant though out the duration of the additions. But knowing that this is not always the case, relative flow rates can be established as often as practically possible or desirable. This can be achieved by pulse feeding the materials at different intervals as will be described in more detail below.

Figure 5:
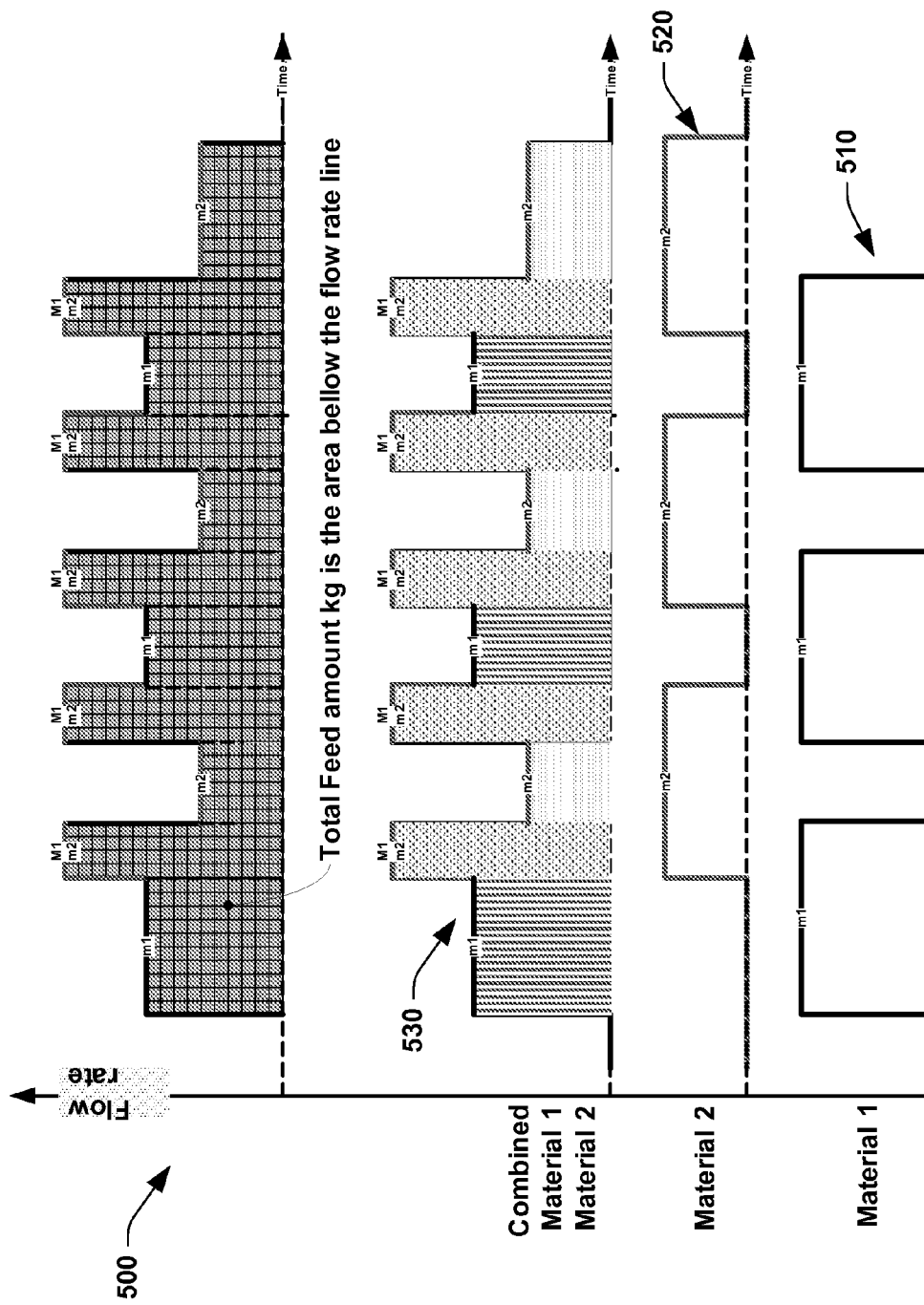
FIG. 5 is a diagram for pulse feeding materials in parallel and measuring such material via a limited number of devices.

FIG. 5 illustrates a diagram 500 for pulse feeding materials in parallel and measuring such material via a limited number of devices. In the diagram 500, flow rates of the different materials are pulsed sequentially to allow determining the individual flow rate contributions to the overall flow rate. As illustrated at 510, material additions for a first material are switched on and off. Similarly, a second material is switched on and off at 520. At 530, the combined material additions are illustrated graphically. As will be described in more detail below, combined additions are reduced to individual material components at times to determine if the individual components of a mixture are being added as desired. Process parameters can be set by designers to minimize the time when single or reduced parallel feed operation is attempted as a check to overall process and feed controls.

Figure 6:
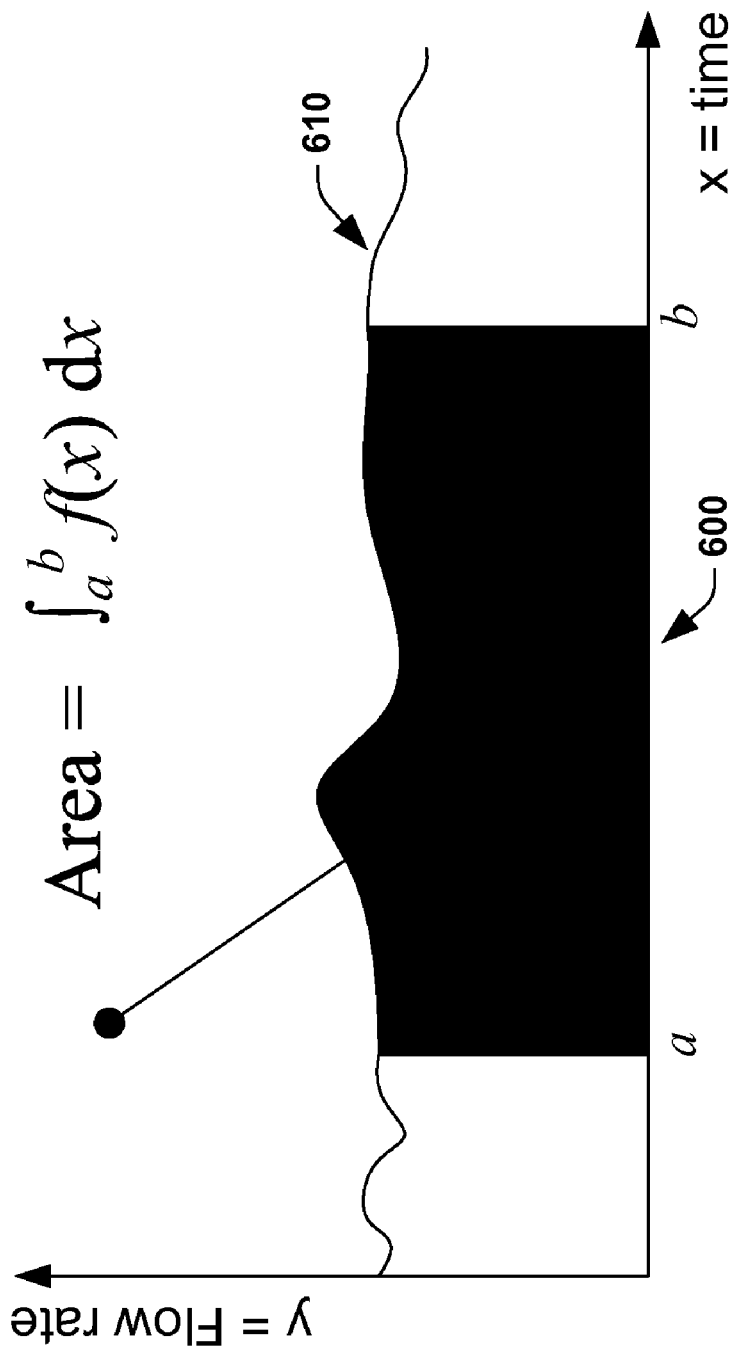
FIG. 6 is a diagram illustrating an integral determination for calculating the amount of a given material.

FIG. 6 illustrates an integral determination for calculating the amount of a given material. In general, the total amount of material fed can be determined by the load cell in example at 210 of FIG. 2 or by integrating the flow rate at 220 of FIG. 2. At 600 of FIG. 6, an area below a flow rate line 610 determines the amount of material; this can be determined by mathematically integrating the flow rate over the duration of the material addition.

Figure 7:
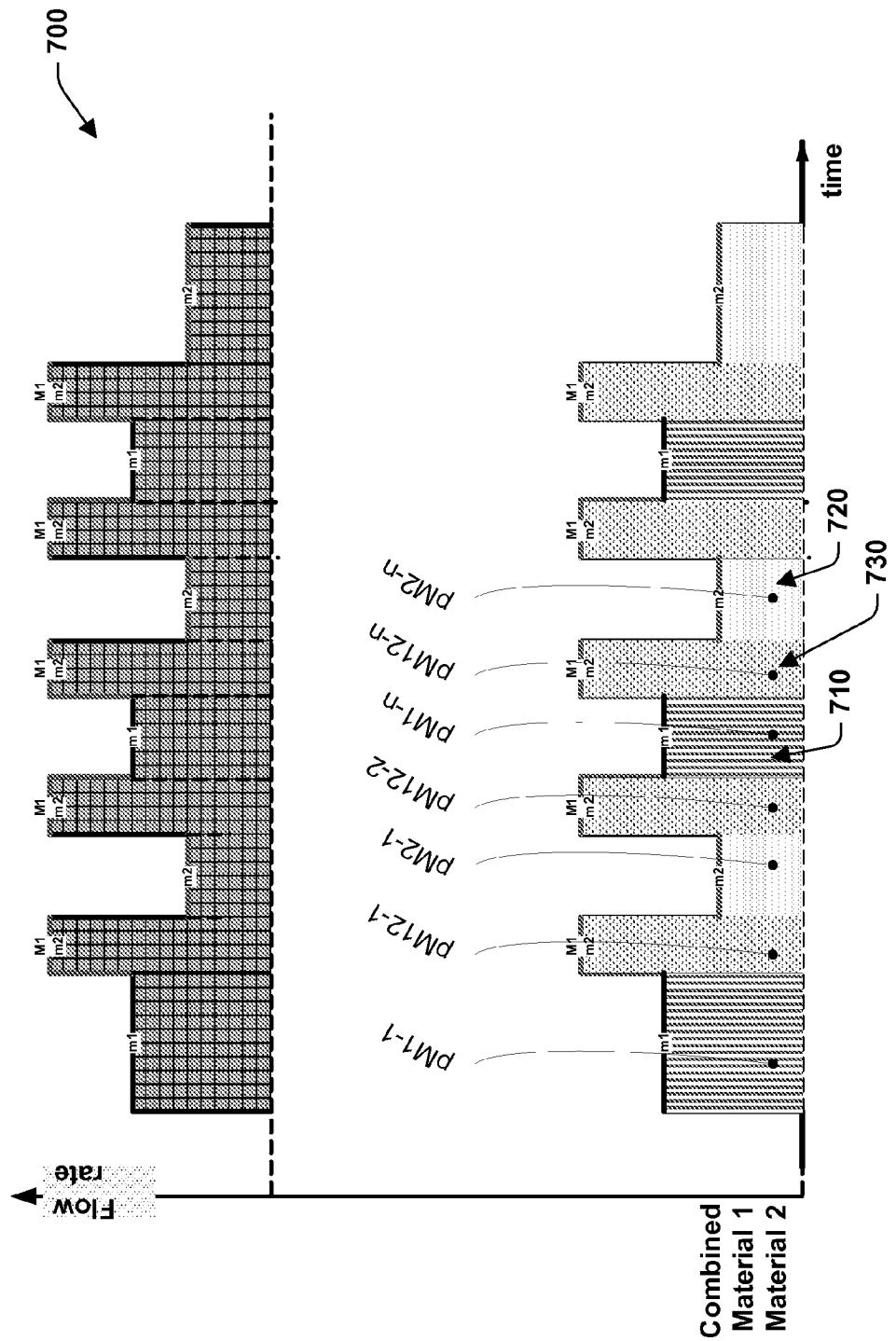
FIG. 7 is a diagram illustrating piece-wise linear computations for determining aggregate material amounts.

FIG. 7 illustrates piece-wise linear computations for determining aggregate material amounts. In order to determine the total amount of M1 and M2 in this example, the flow profile can be broken into its components or partial additions such as:

(pM1-$n$): fed of M1 individually at 710;
(pM2-$n$): fed of M2 individually at 720; and
(pM12-$n$): fed of M1 and M2 combined at 730.

From FIG. 7, it can be observed that the total amount of material M1, M2 and M12 fed is the sum of all the partial additions of each material such that:

$$TpM1 = \Sigma_{k=1}^{n}(pM1\text{-}n)\text{means}(pM1\text{-}1) + (pM1\text{-}2) + \ldots + (pM1\text{-}n).$$

$$TpM2 = \Sigma_{k=1}^{n}(pM2\text{-}n)\text{means}(pM2\text{-}1) + (pM2\text{-}2) + \ldots + (pM2\text{-}n).$$

$$TpM12 = \Sigma_{k=1}^{n}(pM12\text{-}n)\text{means}(pM12\text{-}1) + (pM12\text{-}2) + \ldots + (pM12\text{-}n).$$

As can be appreciated, a plurality of such segments can be determined. Parameters can be set for the periodicity of such measurements during a parallel feed process.

Figure 8:
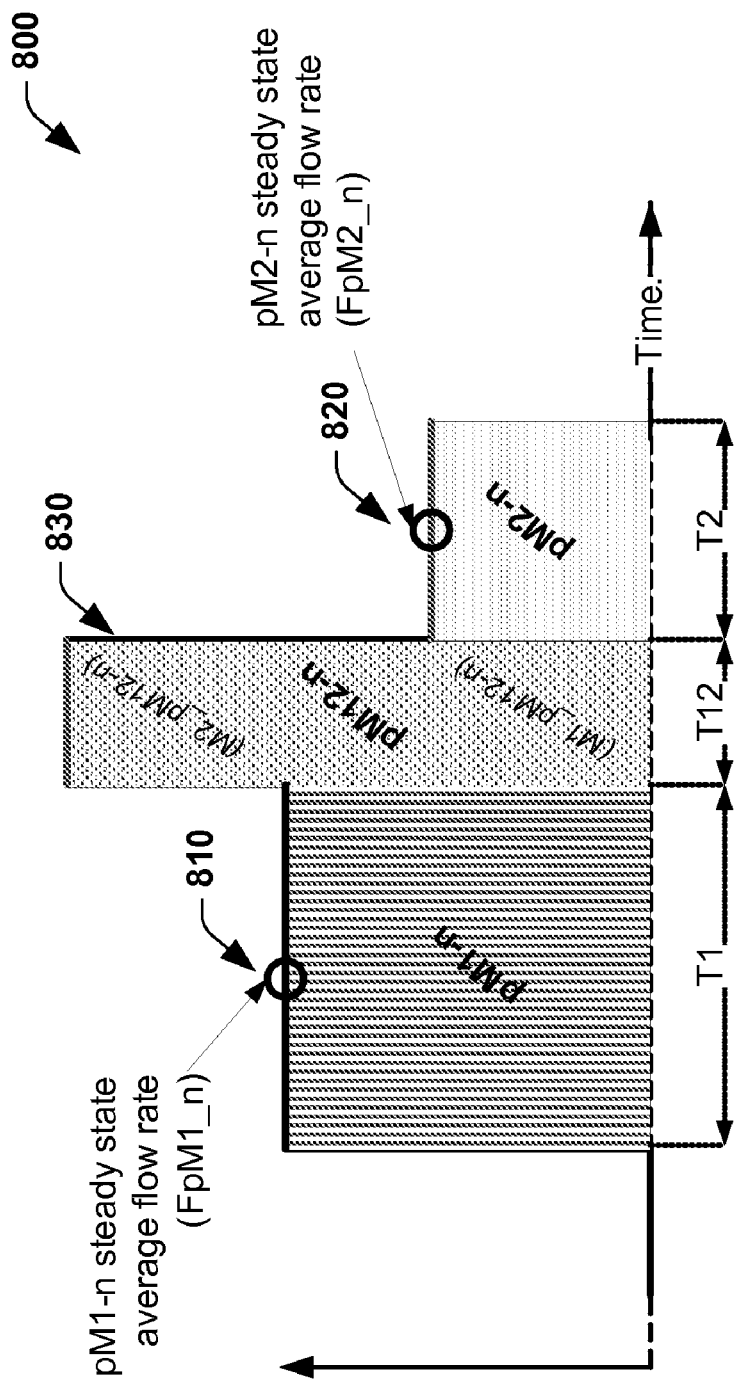
FIG. 8 is a diagram illustrating an example for determining individual components in a combined material addition.

FIG. 8 illustrates an example 800 for determining individual components in a combined material addition. A component of M1 (M1_pM12_$n$) and M2 (M2_pM12_$n$) in the partial combined addition (pM12-$n$) can be estimated by the ratios of the flow rates on each side of a combined addition as shown at 810 and 820. Using the amount of the partial combined add (pM12-$n$) and the steady state flow rate of M1 (FpM1_$n$) and M2 (FpM2_$n$) an estimate of the component of M1 and M2 in the combined add, (M1_pM12-$n$) and (M2_pM12-$n$) can be determined as:

$$M1\_pM12\text{-}n = (pM12\text{-}n)[(FpM1\_n)/((FpM1\_n) + (FpM2\_n))]$$

$$M2\_pM12\text{-}n = (pM12\text{-}n)[(FpM2\_n)/((FpM1\_n) + (FpM2\_n))]$$

Figure 9:
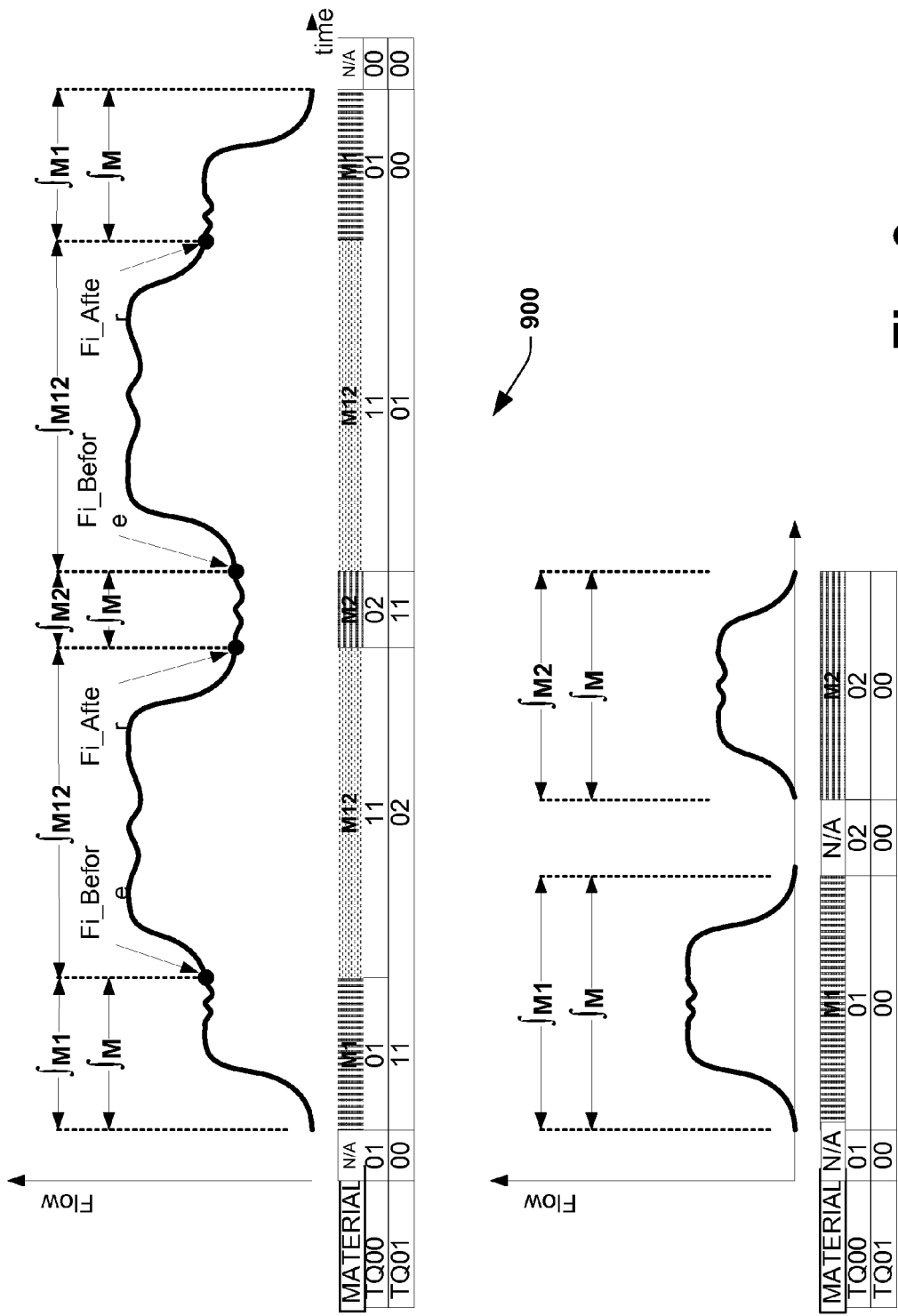
FIG. 9 is a more detailed diagram illustrating an example for determining individual components in a combined material addition.

In order to determine the partial areas, the flow rate is to be integrated over the duration of the partial addition (area) at 830, determining the starting and stopping points of this integration can be established by looking at the flow (F) and monitoring its rate of change, this being the first derivative of the flow rate (DF/dt). Relating to FIG. 8, FIG. 9 illustrates a more detailed diagram 900 for determining individual component amounts and corresponding aggregate amounts of materials. As illustrated, respective feed rates are more accurately represented as ramping up and down to combined or individual amounts and includes potential representative noise in the diagrams.

Figure 10:
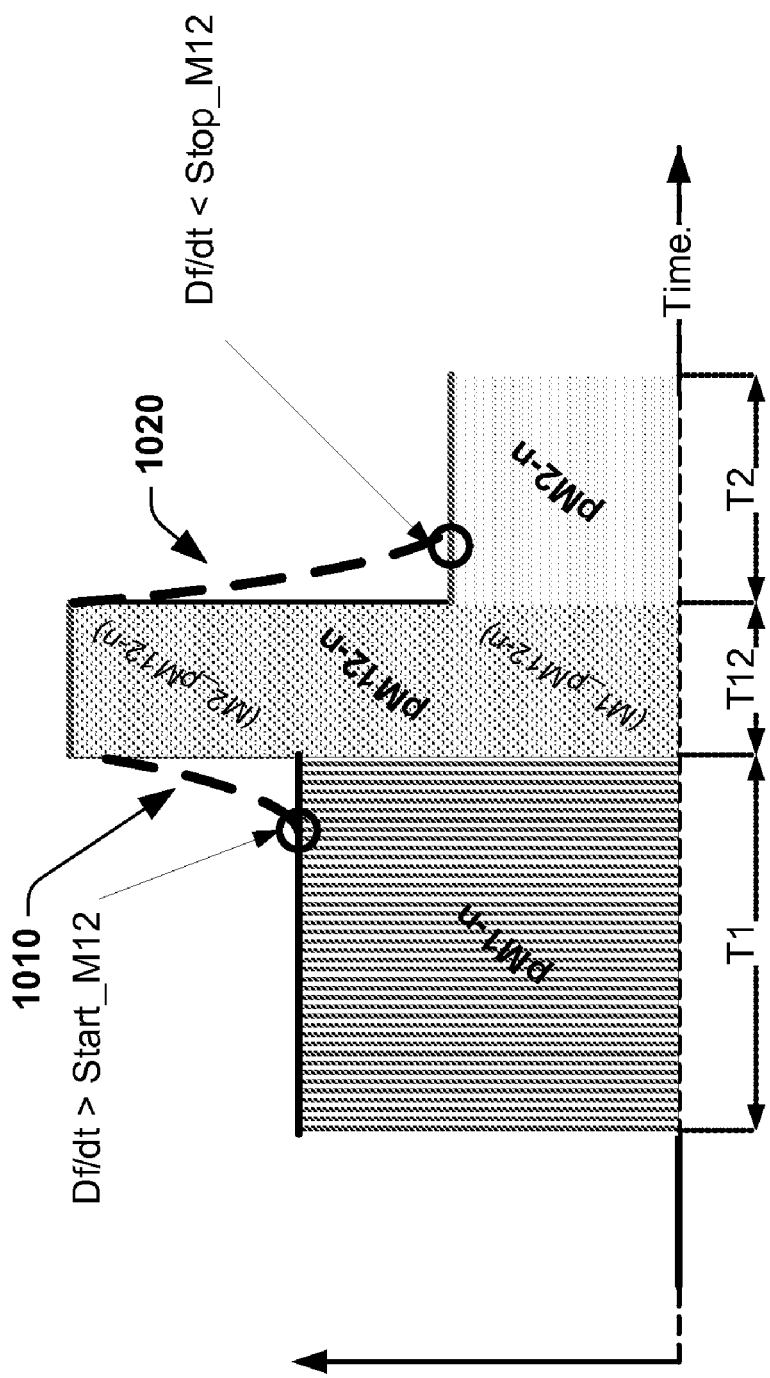
FIG. 10 is a diagram illustrating an example for determining derivatives of individual components in a combined material addition.

FIG. 10 illustrates how the start and stoppage of a combined process can be determined by examining derivative portions of flow data. In this example, the start of the combined flows (T12) can be considered to be the beginning of a positive (+) rate of change as illustrated at 1010. This Start point should consider a minimum reference rate of change (Start_M12) and be maintained over a minimum start duration (mStart_M12). The end of the combine flows (T12) can be considered to be the end of a negative (−) rate of change as illustrated at 1020. This end point should consider a minimum reference rate of change (Stop_M12) and be maintained over a minimum duration (mStop_M12). In order to determine the Total amount of M1 and M2 in the combined flow, sum the contributions of each material to the partial combined additions such as:

$$TpM1\_M12 = \Sigma_{k=1}^{n}(M1\_pM12\text{-}n)\text{means}(M1\_pM12\text{-}1) + (M1\_pM12\text{-}2) + \ldots + (M1\_pM12\text{-}n); \text{ and}$$

$$TpM2\_M12 = \Sigma_{k=1}^{n}(M2\_pM12\text{-}n)\text{means}(M2\_pM12\text{-}1) + (M2\_pM12\text{-}2) + \ldots + (M2\_pM12\text{-}n).$$

When the amount of M1 that was added individually has been determined, and the amount of M1 that was added in combination with M2, it can be determined the total amount of material M1 (TM1) such as:

$$TM1 = TpM1 + TpM1\_M12$$

Likewise, the total amount of material M2 (TM2) is the sum of the amount of M2 that was added individually plus the amount of M2 that was added in combination with M1.

$$TM2 = TpM2 + TpM2\_M12$$

Figure 11:
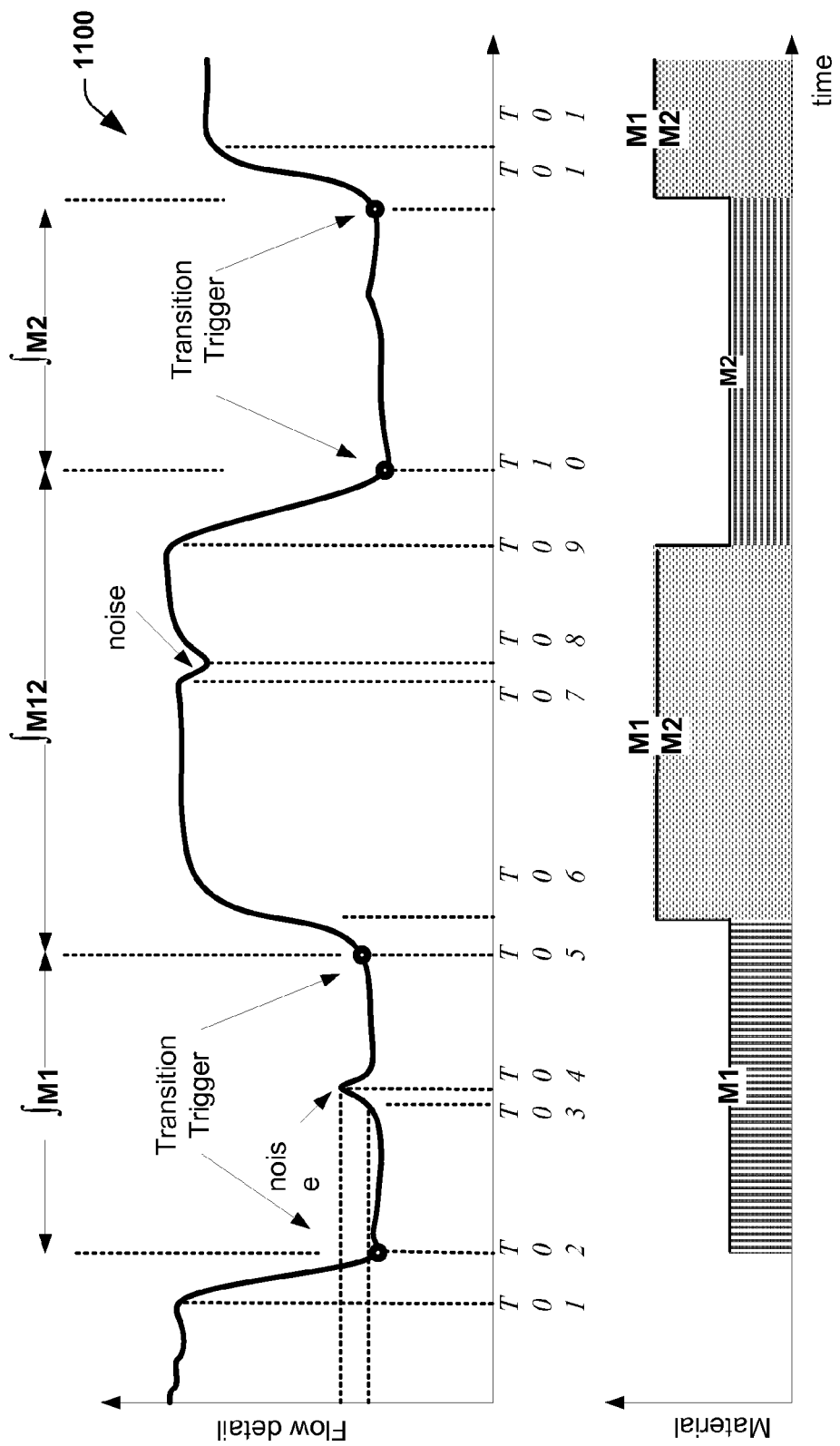
FIG. 11 is a more detailed diagram illustrating an example for determining derivatives of individual components in a combined material addition.

Therefore, contrary to normal practices, a single flow meter or load cell (or reduced numbers of measuring devices) can be used to perform parallel material additions. Relating to FIG. 10, FIG. 11 illustrates a more detailed diagram 1100 for determining derivatives that indicate the start and stop of combined flows. As illustrated, respective feed rates are more accurately represented as ramping up and down to combined or individual amounts and includes potential representative noise in the diagrams.

Figure 12:
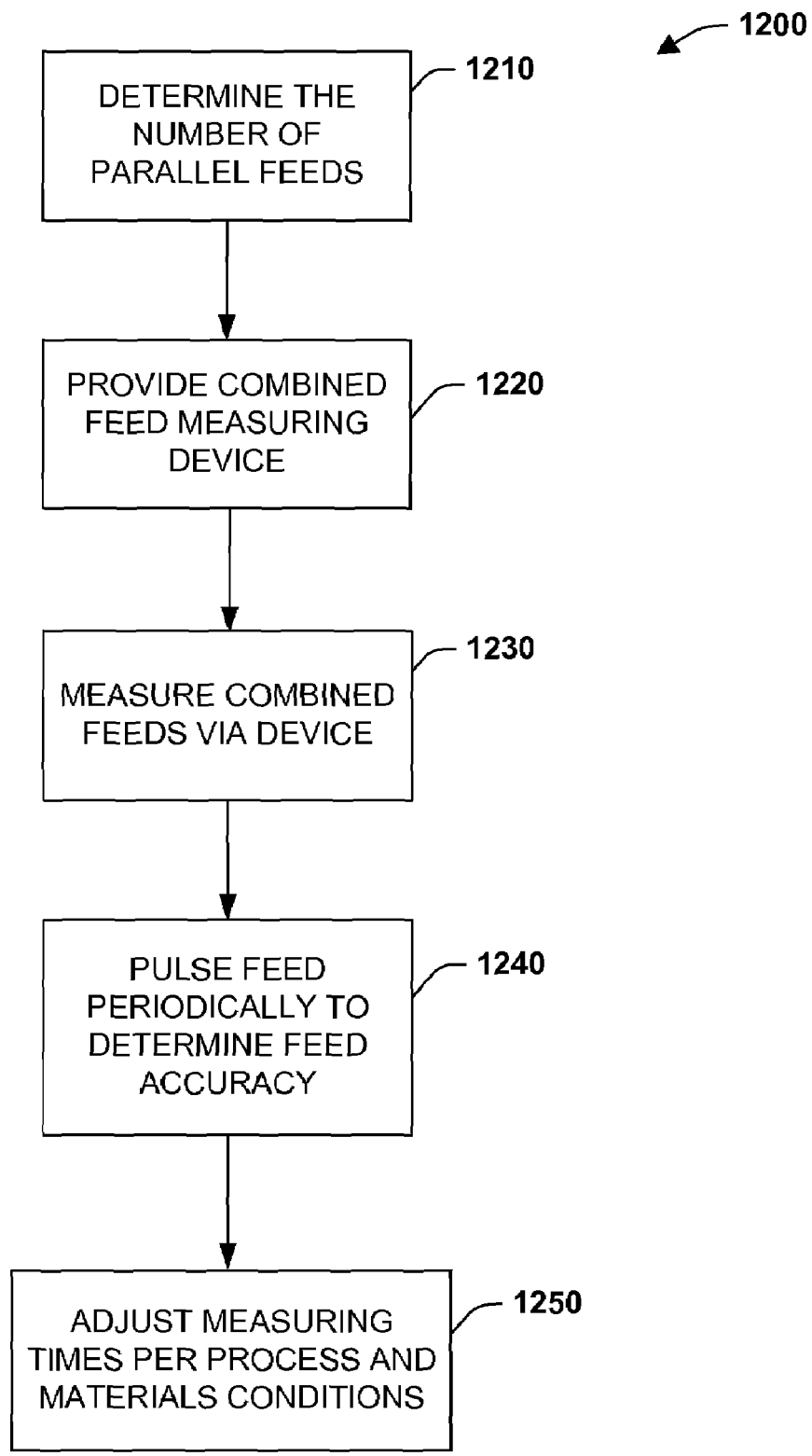
FIG. 12 is a flow diagram illustrating a process for totalizing parallel material feeds.

FIG. 12 illustrates a process 1200 for totalizing parallel feeds. While, for purposes of simplicity of explanation, the methodology is shown and described as a series of acts, it is to be understood and appreciated that the methodology is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology as described herein.

FIG. 12 illustrates an automated industrial process 1200 for measuring parallel feed additions to the respective process. Proceeding to 1210, a determination is made as to the number of parallel feed additions to a given process. Many of the examples above illustrated two feeds per a respective process by a plurality of such feeds can be employed. This includes materials that are solid and/or granular in nature and/or includes materials that are more liquid in nature or gases. This can also include feeds that provide granular mixes in combination with liquid mixtures. At 1220, one or more feed measuring devices are provided. This can include flow rate meters, load cell devices for measuring weights, magnetic or analog measuring devices, digital devices, and or combinations of analog of digital measuring devices. In general, a single measuring device is employed to measure parallel feed, however, it is to be appreciated that more than one measuring device can be employed. In general, fewer measure devices than parallel feeds are provided in order to mitigate equipment costs in an automated industrial process.

Proceeding to 1230, materials added from parallel feeds are measured in parallel. This can include staggered addition processes where one or more feeds are started and then after a period of time, other feeds are added to the process in parallel, where substantially all such feeds are measured by the devices in 1220. At 1240, one or more components of a feed operation are periodically switched in and out of a combined feed operation. Such switching allows for testing of individual and combined ratios of feed materials to facilitate that desired combinations of materials are added to a given batch, recipe, or process. Switching times can be calculated and/or determined empirically depending on the process and/or materials at hand. For instance, more granular processes may have more variability than a more liquid process and thus, may have to be switched in and out more frequently to monitor that correct amounts are being added to the respective process.

At 1250, interface components can be provided to allow designers to adjust various parameters in the parallel feed industrial process. For example, thresholds can be adjusted to determine when flow rates have achieved suitable steady states of desired flow ranges. Another parameter may include a periodicity adjustment that control how often a respective feed is switched in and out during a combined feed addition. Such adjustments facilitate variability with different materials, properties, conditions, and/or process-related dynamics.

What has been described above includes various exemplary aspects. It is, of course, not possible to describe every conceivable combination of components or methodologies for purposes of describing these aspects, but one of ordinary skill in the art may recognize that many further combinations and permutations are possible. Accordingly, the aspects described herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An industrial automation system to process materials, comprising:
   a totalizer component that determines an aggregated amount of materials supplied in parallel from at least two feed locations; and
   a logic component that periodically monitors respective amounts of respective materials supplied from the at least two feed locations to establish a reference ratio relating to the respective materials to determine respective amounts of the respective materials supplied, wherein the logic component receives respective measurements of the respective amounts of respective materials supplied from the at least two feed locations from at least one measurement component, the at least one measurement component comprising a number of measurement components that is less than a number of feed locations and wherein the logic component switches each of the at least two feed locations between an on state and an off state at respective periodic times to facilitate measurement while at steady state, of the respective materials supplied and determination of the respective amounts of the respective materials supplied.

2. The system of claim 1, the totalizer component further comprises an integrator component for determining an aggregate materials amount.

3. The system of claim 1, the totalizer component further comprises a derivative component to determine material transitions.

4. The system of claim 3, the material transitions are determined at a front or back portion of a combined material feed.

5. The system of claim 4, the logic component further comprises switching logic to switch at least one of the at least two feed locations between an on state and an off state in a parallel feed process.

6. The system of claim 1, the at least two feed locations include granular, gases or liquid feed materials.

7. The system of claim 1, further comprising a programmable logic controller (PLC) to operate the logic component or the totalizer component.

8. The system of claim 7, the totalizer component is operated as at least one instruction in the PLC.

9. The system of claim 1, further comprising at least one measuring device to measure material amounts for parallel feed operations.

10. The system of claim 9, the measuring device comprising a load cell or a flow meter.

11. The system of claim 1, further comprising a component to determine a ratio of at least one material with respect to at least one other material.

12. The system of claim 11, further comprising a component to determine a ratio of at least one material with an overall flow rate.

13. The system of claim 1, further comprising a derivative component to determine a flow rate or a steady state feed operation.

14. The system of claim 13, further comprising an integral component to determine a weight or aggregate for a plurality of materials.

15. The system of claim 1, further comprising a component to stagger feed times between at least two materials.

16. The system of claim 15, further comprising a component to compute a feed amount in view of a known feed amount.

17. The system of claim 16, further comprising a component to determine a difference in flow rates.

18. The system of claim 1, further comprising a component to pulse feed materials at different intervals.

19. The system of claim 1, further comprising a user interface component to adjust feed or material parameters.

20. The system of claim 19, the feed parameters include a pulse interval.

21. The system of claim 1, further comprising a component to trigger a rate determination during a parallel feed operation.

22. The system of claim 1, further comprising a component to monitor a rate of change for a material flow.

23. An industrial control system, comprising:
   means for totalizing data from at least one measuring device;
   means for feeding at least two materials in parallel to the at least one measuring device, the at least one measurement device comprising a number of measurement devices that is less than a number of materials fed from respective feed locations;
   means for switching the at least two materials between an on state and an off state at respective periodic times to facilitate measurement, while at steady state, of respective amounts the respective materials fed to facilitate verifying accuracy of a parallel feed operation; and
   means for monitoring the respective amounts of the respective materials fed from the at least two materials to establish a reference ratio relating to the respective materials to determine respective amounts of the respective materials fed.

* * * * *

UNITED STATES PATENT AND TRADEMARK OFFICE
CERTIFICATE OF CORRECTION

PATENT NO. : 7,660,680 B1 Page 1 of 1
APPLICATION NO. : 11/426441
DATED : February 9, 2010
INVENTOR(S) : John R. Parraga It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 821 days.

Signed and Sealed this

Thirtieth Day of November, 2010

David J. Kappos
*Director of the United States Patent and Trademark Office*